Dec. 28, 1937.   E. McCORMICK ET AL   2,103,543
TRANSMISSION
Filed Sept. 29, 1934   3 Sheets-Sheet 3

INVENTORS.
ELMER McCORMICK
WAYNE H. WORTHINGTON
BY Brown, Jackson, Boettcher & Dienner
ATTORNEYS.

Patented Dec. 28, 1937

2,103,543

UNITED STATES PATENT OFFICE 2,103,543

TRANSMISSION

Elmer McCormick and Wayne H. Worthington, Waterloo, Iowa, assignors to John Deere Tractor Company, Waterloo, Iowa, a corporation of Iowa Application September 29, 1934, Serial No. 746,036

32 Claims. (Cl. 74—327)

The present invention relates generally to transmissions and is particularly concerned with the provision of a new and improved selective sliding gear transmission especially adapted, although not necessarily limited, for use in tractors and similar vehicles.

One of the principal objects of the present invention is the provision in such a transmission of a two-speed splined shaft which carries slidable pinions shiftable to secure different selected speeds. The provision of such a two-speed splined shaft doubles the number of speeds that can be obtained in prior transmissions of this general type.

Another object of the present invention is the provision of new and improved means for securing reverse drive, and which embodies supporting a portion of the reverse gear means on shaft means which functions in connection with selectively controlled driving and driven pinions to transmit the drive to the main driven gears associated with the driving wheels of the vehicle.

A further object of the present invention is the provision of suitable means controlling the selectively positioned pinions, and separate means controlling the rate at which the two-speed splined shaft is driven. In this connection, a further object of the present invention is the provision of means to positively prevent the selection of reverse drive where the splined shaft, through which the reverse drive is transmitted to the traction wheels, is being driven at its higher rate.

An additional object of the present invention resides in the utilization of an auxiliary drive shaft as a support for a portion of the mechanism by which the splined shaft can be optionally driven at two different rates. A still further object of the present invention in this connection is the utilization of a portion of the two-speed splined shaft driving mechanism for driving a power take-off.

These and other objects and advantages of the present invention will be apparent to those skilled in the art after a consideration of the following detailed description of the preferred structural embodiment illustrated in the accompanying drawings.

In the drawings:

Figure 4 is a fragmentary elevational view showing a portion of the gear shifting mechanism and illustrating in particular the means to prevent the selection of reverse drive when the splined shaft is driven at its higher speed; and Figure 5 is a section taken approximately along the line 5—5 of Figure 2.

Figure 2:
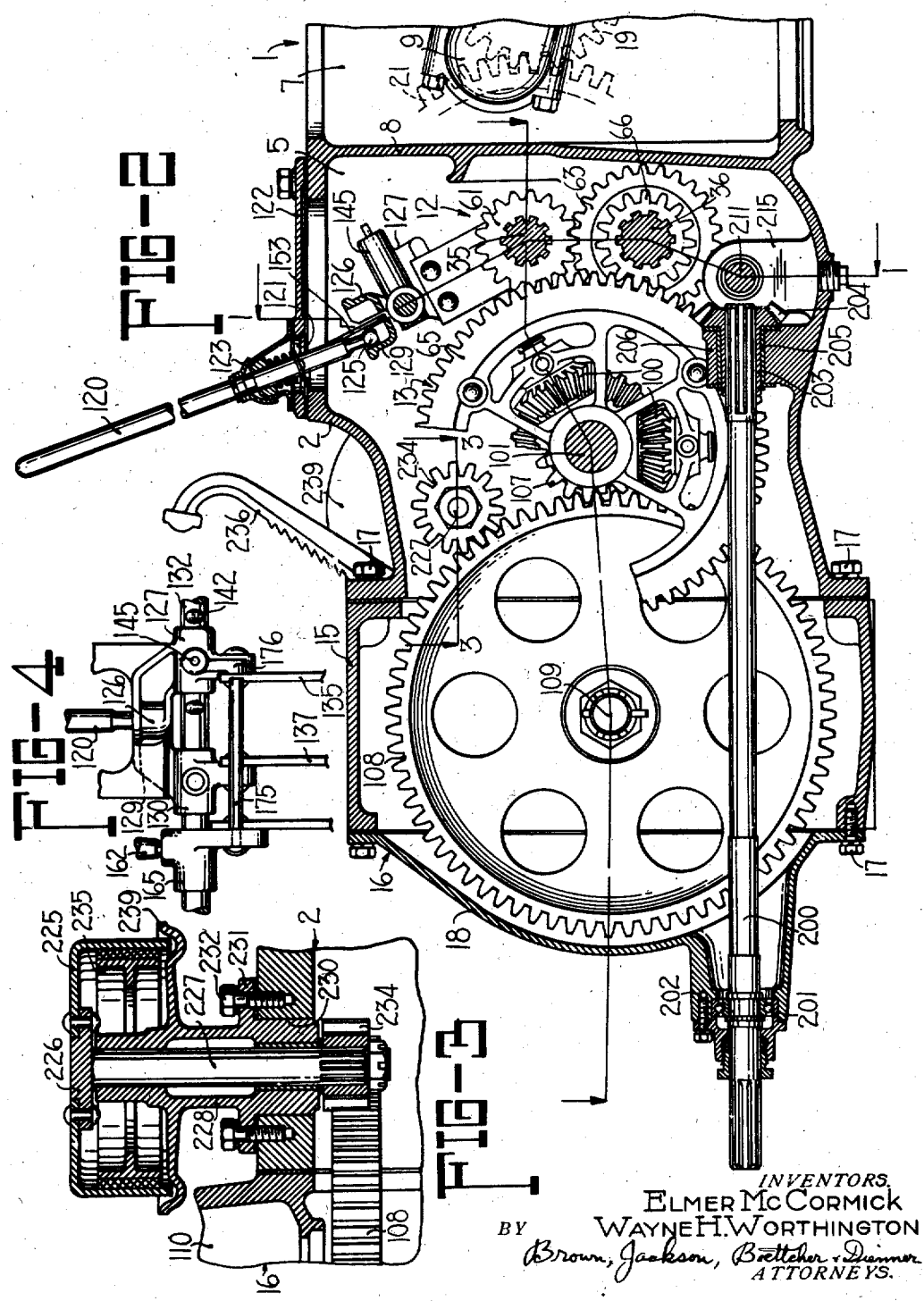
Figure 2 is a vertical section taken along the line 2—2 of Figure 1.

Referring now to the drawings, it will be observed that the present transmission is in the nature of an improvement over the transmission shown in Patent No. 1,702,371, issued February 19, 1929, to Louis W. Witry, and it is our intention to embody a number of improvements over the type of transmission shown in the Witry patent. The transmission we have chosen to illustrate the principles of the present invention is, like the transmission shown in the Witry patent, mounted in a tractor 1 having a main frame or housing 2 that is divided into a rear compartment 5 and a forward compartment 7 by means of an intermediate wall 8. The front compartment 7 constitutes the crank case or housing of the tractor motor and encloses the transverse crank shaft 9 thereof and associated parts, and the rear compartment 5 includes the transmission mechanism, indicated in its entirety by the reference numeral 12, and the differential unit 13. As best shown in Figure 2, the rear end of the compartment 5 is open to receive the central portion 15 of the rear axle housing 16 of the banjo type, which is bolted, as at 17, to the rear end of the main frame housing 2. The rear opening in the axle housing 16 is closed by means of a cover plate 18.

Figure 1:
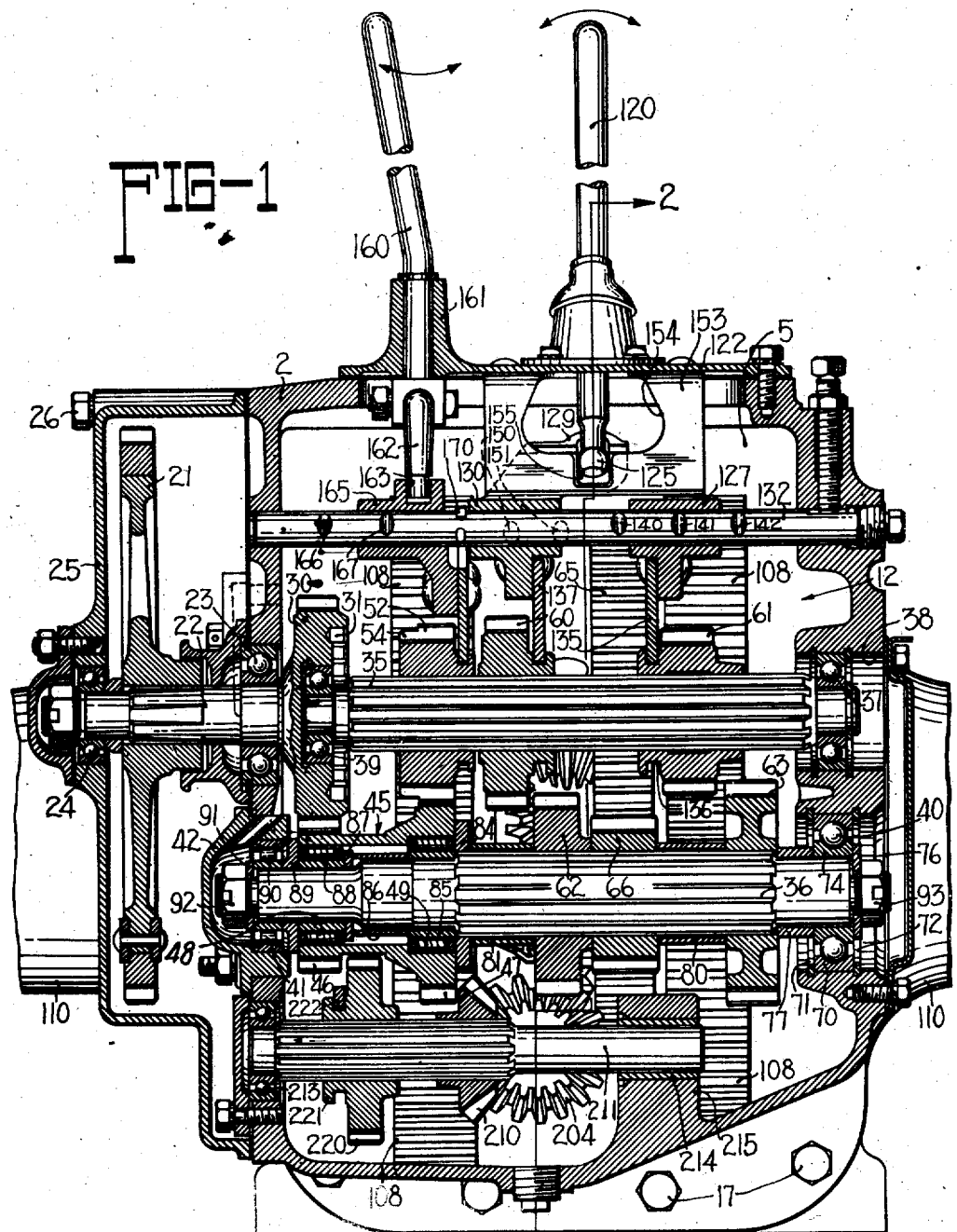
Figure 1 is a transverse vertical section taken along the line 1—1 of Figure 2 through a transmission constructed according to the principles of our invention.

The transmission mechanism 12 is disposed in the rear compartment 5, as best shown in Figure 1, and the connections by which the transmission mechanism is driven from the motor of the tractor are best shown in Figure 5. Referring now to Figure 5 the crank shaft 9 of the motor carries a driving pinion 19 operatively driven therefrom through a clutch 20. The driving pinion 19 meshes with a driving gear 21 suitably splined or otherwise secured on a transmission driving member that includes a shaft 22 which is journaled at one end by bearing means 23 in one side wall of the housing 2 and at the other end by bearing means 24 in a cover housing 25 bolted, as at 26, or otherwise secured to the main frame housing 2, as best shown in Figure 1.

The driving shaft 22 is formed at its inner end with a gear 30 having a plurality of internal clutch teeth 31, and the driving shaft 22 and the gear 30 constitute a motor driven member actuated by the tractor motor for driving the several parts of the transmission mechanism 12. The transmission mechanism includes a splined shaft 35 disposed in axial alignment with the driving shaft 22, and an auxiliary drive shaft 36 is disposed below and parallel to the splined shaft 35. It is to be noted that all of these shafts are disposed transversely of the frame housing 2 and in parallelism with the transverse crank shaft 9. The right hand end, as viewed in Figure 1, of the splined shaft 35 is journaled in bearing means 37 supported in an opening 38 in the side of the frame housing 2, and the other end of the splined shaft 35 is journaled in bearing means 39 supported in a recess in the inner face of the gear member 30. One end of the parallel splined shaft 36 is journaled in a bearing 40 supported in an opening in one side of the frame housing 2, and the opposite end of the shaft 36 is journaled in a bearing 41 supported in a cap 42 removably fixed over an opening in the opposite side of the housing 2. As best shown in Figure 1, the shaft 35 is splined for practically its entire length, while the shaft 36 is splined for only a portion of its length for a purpose which will hereinafter appear.

The splined shaft 35 has been referred to as a two-speed shaft because it may be driven at either of two speeds through driving means associated with the driving gear 30 of the motor driven member. This means includes a compound gear 45 having axially spaced gear sections 46 and 47 and supported by bearing means 48 and 49 on one end of the auxiliary shaft 36. The smaller gear section 46 of the compound gear 45 is in constant mesh with the driving gear 30, and slidably but not rotatably mounted on the two-speed splined shaft 35 at the end thereof adjacent the compound gear 45 is a pinion 52 which is provided with internal splines engaging the splines on the shaft 35. This pinion may be positioned so that its teeth engage the other gear section 47 of the compound gear 45, this being the position illustrated in Figure 1. The pinion 52 is provided with a set of external clutch teeth 54 which are adapted to engage the internal clutch teeth 31 of the driving gear 30, whereby when the pinion 52 is moved to the left as viewed in Figure 1 the splined shaft 35 may be directly connected to the driving shaft 22. The relative diameters of the gears 30, 46, 47 and 52 may be proportioned in any manner desired, but preferably we make the gear portion 47 larger than the gear portion 46 and the pinion 52 and the gear portion 46 smaller than the driving gear 30 whereby these parts constitute an over-drive for the splined shaft 35 when they are arranged in the position shown in Figure 1, the shaft 35 being driven at a lower speed when the clutch teeth 54 engage the internal clutch teeth 31 of the driving gear 30. It is to be noted that the compound gear 45 is journaled on the shaft 36 but, as will appear later, the compound gear 45 may if desired be fixed to the shaft 36 to rotate therewith.

The splined shaft 35, which may be driven from the motor driven member 22—30 at either of two speeds according to the position of the pinion 52 which is controlled by means that will be described later, carries two driving pinions 60 and 61 which are provided with internal splines engaging the splines on the shaft 35, whereby the two pinions are slidable but not rotatable with respect to the shaft 35. The positions of the pinions 60 and 61 may be controlled by any suitable means, but the preferred gear shifting means controlling these pinions which we employ is described below. The auxiliary shaft 36 carries a pair of driven pinions 62 and 63 fixed thereon by any suitable means. These driven pinions are positioned so that they may be engaged, respectively, by the driving pinions 60 and 61 when the latter are selectively shifted. The differential mechanism 13 includes a ring gear 65 which is mounted for rotation in the rear compartment 5 in a position between the driven pinions 62 and 63, and adjacent the driven pinion 62 is a third driven pinion 66 which is so positioned and arranged as to be in constant mesh with the ring gear 65 of the differential 13. As best shown in Figure 1, the position of the ring gear 65 with respect to the driven pinion 63 fixed on the shaft 36 and the slidable driving pinion 61 is such that the latter may be optionally shifted into engagement with either the driven pinion 63 to provide one forward speed or directly into engagement with the ring gear 65 to provide reverse drive. The driving pinion 60 may be shifted from a neutral position, shown in Figure 1, into a position in engagement with the driven pinion 62 to provide a forward speed higher than that provided when the pinion 61 meshes with the pinion 63.

As mentioned above, the compound gear 45 is journaled for rotation on the shaft 36 while the driven pinions 62, 63 and 66 are fixed against rotation relative to the shaft 36, being also fixed against axial movement thereon. The bearing means 40 includes an outer race 70 which is held in position in the side wall of the frame casing 2 by a pair of rings 71 and 72, and the inner race 74 of the bearing means 40 is clamped between a plate 76 on one side and a sleeve 77 on the other side which bears against the splined portion of the driven pinion 63. Disposed between the pinion 63 and the pinion 66 is a sleeve 80. The ring gear driving pinion 66 bears directly against the driven pinion 62, and a sleeve 81 bears at one end against the driving pinion 62 and at the other end bears against a splined ring 84 against which the inner race 85 of the bearing means 49 is in engagement. An inner sleeve 86 is disposed between the inner race 85 and a ring 87. Against the latter ring bears the inner race 88 of the bearing means 48, and against the other end of the inner race 88 a ring 89 is disposed and is, in turn, engaged by one edge of the inner race 90 of the bearing means 41. The other edge of the race 90 is engaged by a washer 91 against which a nut 92 at this end of the shaft 36 is threaded. A nut 93 at the other end of the shaft bears against the washer 76, and by adjusting these nuts 92 and 93 the pinions 62, 63 and 66, and the compound gear element 45, may be brought to the proper position. It is to be noted, also, that the rings 84 and 89 serve to prevent the compound gear 45 from shifting axially. If desired, the axial position of all of these elements may be shifted by loosening one nut and tightening the other.

The differential 13, the ring gear 65 of which is driven by the pinion 66, is of conventional construction, and preferably includes three bevel pinions 100, only two of which are shown in Figure 2. These bevel pinions are suitably mounted in the ring gear 65, as best shown in Figure 2, and the ring gear is fixed on a shaft 101 which is journaled in bearings 102 carried on the opposite sides of the frame housing 2. The bevel pinions 100 mesh with bevel gears 104 which are fixed on the inner end of sleeves 105 journaled for rotation on the shaft 101 and disposed on opposite sides of the ring gear 65, as best shown in Figure 5. On the outer end of each of the sleeves 105 a driving pinion 107 is fixed, and these driving pinions mesh with drive gears 108 fixed to the inner ends of drive axles 109 journaled in the sleeve portions 110 of the banjo axle housing 16. Preferably, the outer ends of the drive axles 109 are splined to provide for shifting the traction wheels (not shown) laterally to adjust the tread of the tractor.

The slidable driving pinions 60 and 61 are shifted by means of a main gear shifting lever 120 which extends through an opening 121 in the cover plate 122 of the transmission case, and the lever 120 is supported from the cover 122 by means of a conventional ball and socket connector 123. The lower end of the gear shift lever 120 is provided with a ball 125 which can be shifted either into a yoke 126 of a gear shift fork 127 or into a yoke 129 of a gear shift fork 130. The forks 127 and 130 are slidably mounted upon a gear shifter rod or rail 132 which is disposed parallel to the splined shaft 35 and has its ends anchored by any suitable means to the sides of the housing 2. The shift fork 127 includes a bifurcated plate 135 which engages in a groove 136 formed in the hub of the driving pinion 61, and a similar bifurcated plate 137 is carried by the other shift fork 130 and and engages in a similar groove formed in the hub of the driving pinion 60. A plurality of notches 140, 141 and 142 are provided adjacent one end of the shift rod 132, and the shift fork 127 carries a spring-pressed plunger 145 (Figure 4) which is adapted to cooperate with the notches 140, 141 and 142 to yieldingly hold the shift fork 127 in any one of the positions. When the spring-pressed plunger 145 drops in the notch 142, after the shift fork 127 has been moved to the right in Figure 1, the driving pinion 61 is held in mesh with the driven pinion 63, and when the shift fork 127 has been moved to the left in Figure 1 the spring-pressed plunger 145 drops in the notch 140 to hold the driving pinion 61 in mesh with the ring gear 65. Figure 1 shows the shift fork 127 when the spring-pressed plunger 145 is in engagement with the notch 141 for the purpose of holding the driving pinion 61 in neutral position.

The shift fork 130 is provided with a similar spring-pressed plunger (not shown) which is adapted to cooperate with notches 150 and 151 to hold the shift fork 130 in either of two positions, one position being when the driving pinion 60 is in neutral, the position shown in Figure 1, and the other position being the position in which the pinion 60 meshes with the driven pinion 62, this latter position being the one which the parts occupy when the shift fork 130 has been moved to the right in Figure 1 until the spring-pressed plunger associated therewith engages the notch 151.

A plate 153 is secured to and extends downwardly from the cover plate 122 in between the two shift forks 127 and 130 (see Figure 2) and is provided with an opening 154 having a central recess 155 in the lower central portion thereof to register with the sockets in the shift forks 127 and 130 when they are in their neutral position. The purpose of this plate is to make it necessary that the shift lever 120 be brought back to neutral position before being moved out of engagement with one of the shift forks and into engagement with the other. This makes it impossible to engage both of the pinions 60 and 61 at any one time.

The position of the pinion 52 is controlled by means of an auxiliary shifting lever 160 which is journaled in an upright sleeve 161, either formed integral with or carried by the cover plate 122, and at its lower end the auxiliary gear shift lever 160 is provided with a crank arm 162 fixed thereto and arranged to engage in a slot or depression 163 formed in a shift fork 165 which is also slidable on the shift rod 132. This end of the rod 132 is also provided with a spring-pressed plunger, similar to the plunger 145 referred to above, which cooperates with notches 166 and 167 to hold the shift fork 165 in either of its two positions, namely, with the pinion 52 in engagement with the gear 47 or in engagement with the driving gear 30. To prevent the shift fork 165 from being shifted too far to the right, as viewed in Figure 1 a stop has been provided on the shift rod 132. This stop takes the form of a cotter pin 170 which is disposed and secured in place in a transverse hole in the rod 132.

The operation of the transmission mechanism so far as has been described above is substantially as follows:

The splined shaft 35 may be driven at two different speeds, depending on whether the pinion 52 engages the gear 47 or the driving gear 30. Figure 1 shows the splined shaft 35 arranged to be driven at a higher speed than the driving shaft 22, since the pinion 52 engages the gear 47, in which position the shaft 35 is driven through the overdrive gear assembly. When the pinion 52 is shifted to the left in Figure 1, by swinging the lever 160 to the right, the teeth 54 engage the teeth 31 on the driving gear to connect the shafts 22 and 35 directly at a one-to-one ratio.

The drive from the two-speed splined shaft 35 is transmitted to the ring gear 65 of the differential 13, either through the pinion 60 or the pinion 61. The pinion 60 is controlled by the shift fork 130, and the pinion 60 may be shifted to the right as viewed in Figure 1 to bring the same into mesh with the driven pinion 62, independently of the position of the pinion 52 referred to above. When the pinion 60 engages the pinion 62, the drive from the tractor motor is through the pinion 20 and gear 21 to the driving shaft 22, and from the driving gear 30 either directly to the splined shaft 35 or to the overdrive compound gear member 45, and the splined shaft 35 rotates the pinion 60, which causes the rotation of the pinion 62 and the pinion 66 fixed with respect thereto. The pinion 66 drives the ring gear 65 of the differential. By properly actuating the gear shift lever 120, the pinion 60 may be moved to or left in its neutral position, that shown in Figure 1, and the driving pinion may then be moved to engage either the driven pinion 63 or the ring gear 65 itself. When the pinion 61 engages the pinion 63, the vehicle is arranged for its low speed forward, and when the pinion 61 engages the ring gear 65 directly, the vehicle is arranged for reverse. The rate at which the vehicle is actually driven forward and the pinion 61 engages the pinion 63 depends on whether the auxiliary gear shift lever 160 has positioned the pinion 52 in engagement with the gear 47 or the driving gear 30, the latter affording the lower drive.

In order that the tractor shall not be driven to fast in reverse, means has been provided for preventing the engagement of the pinion 61 with the ring gear 65 so long as the pinion 52 engages the gear portion 47, it being remembered that this latter arrangement provides for driving the two-speed splined shaft 35 at its higher rate. This means takes the form of a rod 175 (Figure 4) fixed to the shift fork 165 and extending laterally therefrom in parallelism with respect to the shift rod 132. The rod 175 is of such a length that when the shift fork 165 is in the position in which the pinion 52 is in engagement with the pinion 47, the end of the rod 175 will strike a stop or abutment 176 provided on the shift fork 127 whenever an attempt is made to shift the fork 127 toward the left, as viewed in Figures 1 and 4, to engage reverse drive by meshing the driving pinion 61 directly with the ring gear 65. However, whenever the shift fork 165 has been moved to the left, as viewed in Figure 1, so that the pinion 52 engages the driving gear 30 to effect the direct drive between the shaft 22 and the two-speed splined shaft 35, the rod 175 is moved out of the way of the stop 176, and in this position the shift fork 127 may then be moved to the left to bring the pinion 61 into mesh with the ring gear 65 to thereby establish reverse drive.

A power take-off shaft 200 is disposed in the lower portion of the frame housing 2 and is positioned to extend longitudinally of the tractor between the drive gears 108 on the inner ends of the axles or drive shafts 109. The rear end of the power take-off shaft 200 is journaled in a bearing 201 that is mounted in a sleeve 202 formed integral with the rear cover plate 18. The forward end of the power take-off shaft 200 has a splined connection with the hub 203 of a bevel gear 204. The bevel gear 204 has its hub portion 203 journaled in bearing means 205 mounted in a longitudinal boring provided in an upstanding lug 206 which is preferably, but not necessarily, formed integral with the bottom of the housing 2. The bevel gear 204 meshes with a bevel gear 210 (Figure 1), which is mounted on the splined portion of a jack shaft 211. The jack shaft 211 is disposed in parallelism with respect to the shafts 35 and 36 and is journaled in a bearing 213 carried in one side wall of the housing 2 and a bearing 214 carried by a lug 215 extending upwardly from the bottom of the housing 2. The splined section of the shaft 211 carries a slidably mounted pinion 220 which is provided with a grooved hub 221 engaged by a shifter element 222 by which the position of the pinion 220 is controlled. The pinion 220 may be shifted into or out of mesh with the gear section 46 of the compound gear 45, and when the pinion 220 is meshed with the gear 46 the shaft 211 is driven, and when the latter is rotated, the bevel gears 204 and 210 transmit the power to the power take-off shaft 200 for the purpose of transmitting the drive to associated operating units.

Figure 3:
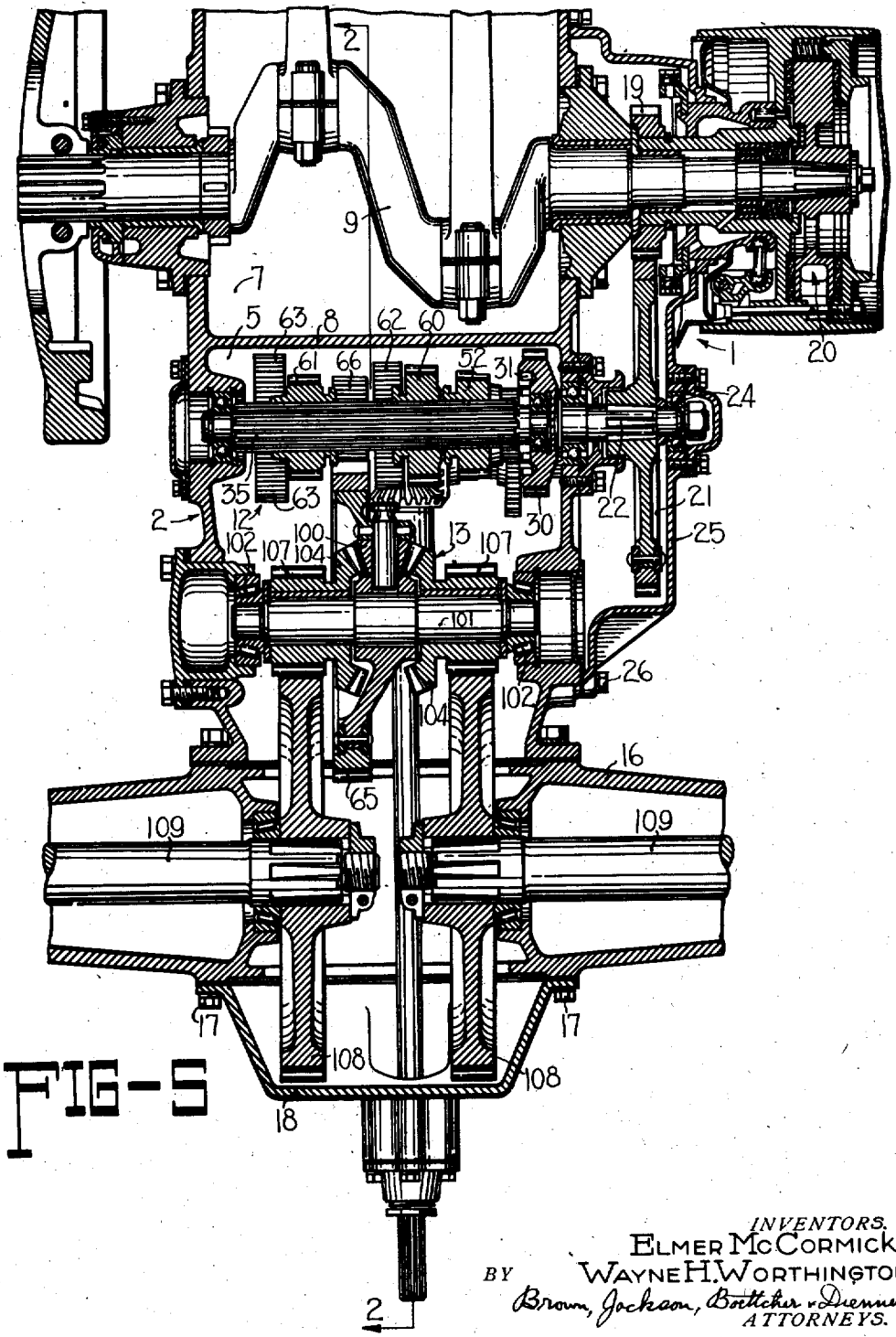
Figure 3 is a section taken along the line 3—3 of Figure 2, showing one of the two brakes associated with the traction wheels.

A pair of differential brakes are provided on opposite sides of the tractor and are mounted in separate shafts, as best shown in Figure 3, which illustrates one of the differential brakes, the other being of the same construction. Referring now to Figure 3, the brake drum 225 is fixed to the flange 226 of a brake shaft 227, the latter being journaled in a sleeve 228 which extends into and is bolted over an opening 230 in the side of the housing 2. For this purpose the sleeve 228 is provided with a bolting flange 231 having openings to receive bolts 232. At its inner end, the brake shaft 227 carries a pinion 234 suitably fixed thereto in such a position that, as shown in Figure 2, the pinion 234 engages the associated drive gear 108. An internally extending brake shoe 235 is controlled by means of a foot pedal 236 which is mounted by any suitable means on the brake supporting sleeve 228. Preferably, also, the sleeve 228 carries a cover flange 239 which serves to prevent the entrance of dust and dirt and the like into the brake drum 225.

While we have shown and described above the preferred structure in which the principles of the present invention have been embodied, it is to be understood that our invention is not to be limited to the specific details shown and described, but that, in fact, widely different means may be employed in the practice of the broader aspects of our invention.

What we claim, therefore, and desire to secure by Letters Patent is:

1. A selective speed transmission comprising a casing, a motor driven member journaled for rotation in said casing, a splined shaft rotatably mounted in said casing, means for coupling said splined shaft to said member whereby said splined shaft may be driven from said motor driven member at either of two speeds, a main driven gear journaled in said casing for rotation about an axis therein, gear means journaled for rotation about the same axis as a portion of said two-speed coupling means and operatively connected with said main driven gear, and a driving pinion slidably mounted on said splined shaft and optionally slidable into engagement with either said gear means or said main driven gear.

2. A selective speed transmission comprising a casing, a motor driven member in said casing, a splined shaft rotatably mounted in said casing, means for coupling said splined shaft to said member whereby said splined shaft is driven from said member at one speed, speed change means through which said splined shaft may be coupled to said member to drive said splined shaft from said member at a different speed, two different size driven pinions fixedly connected and mounted in said casing for rotation about an axis parallel to said splined shaft, a main driven gear meshing with the smaller of said driven pinions, and a driving pinion slidably but non-rotatably mounted on said splined shaft and slidable into engagement with either the larger of said driven pinions or said driven gear.

3. A selective speed transmission comprising a casing, a motor driven member in said casing, a splined shaft rotatably mounted in said casing in axial alignment with said member, means for directly coupling said splined shaft to said member whereby said splined shaft is driven from said member at the same speed, speed change means through which said splined shaft may be coupled to said member to drive said splined shaft from said member at a different speed, two different size driven pinions fixedly connected and mounted in said casing for rotation about an axis parallel to said splined shaft, a main driven gear meshing with the smaller of said driven pinions, and a driving pinion slidably but non-rotatably mounted on said splined shaft and slidable into engagement with either the larger of said driven pinions or said driven gear.

4. A selective speed transmission comprising a casing, a motor driven member journaled for rotation in said casing, a splined shaft rotatably mounted in said casing, means for coupling said splined shaft to said member whereby said splined shaft may be driven from said motor driven member at either of two speeds, a supporting shaft member mounted in said casing and arranged to support a portion of said last named means, a compound gear member carried on said supporting shaft means, a main driven gear meshing with one of the gear portions of said compound gear, and a driving pinion slidable but non-rotatably mounted on said splined shaft and slidable into engagement with either said main driven gear or the other of the gear portions of said compound gear.

5. A selective speed transmission comprising a casing, a motor driven member journaled for rotation in said casing, a splined shaft rotatably mounted in said casing, means for coupling said splined shaft to said member whereby said splined shaft is driven from said member at one speed, supporting shaft means mounted in said casing, speed change means to which said splined shaft may be coupled to said motor driven member to drive the splined shaft from said member at a different speed, said speed change means including a compound gear mounted on said supporting shaft means, a second compound gear mounted on said supporting shaft means, a main driven gear meshing with one of the gear portions of said second compound gear, and a driving pinion slidably mounted on said splined shaft and slidable into engagement with the other gear portion of said second compound gear or said main driven gear.

6. A selective speed transmission comprising a casing, a motor driven member in said casing, a splined shaft rotatably mounted in said casing, supporting shaft means disposed in said casing below said splined shaft, a main driven gear mounted for rotation in said casing, a pair of compound gear members carried by said supporting shaft means, one of said compound gear members being rotatable with respect to the other and one of said compound gear members including a gear portion operatively connected with said motor driven member and having another gear portion disposed adjacent the other compound gear member, a pinion slidably mounted on said splined shaft and adapted in one position to engage said motor driven member and in another position to engage said other gear portion of the compound gear member associated with said motor driven member, a second pinion disposed adjacent said first named pinion and slidably mounted on said splined shaft for movement toward engagement with the gear portion of the other compound gear which is adjacent said first compound gear, said other compound gear member including a pinion meshing with said main driven gear and a third gear portion disposed opposite said first gear portion thereof, and a pair of pinions slidably mounted on said splined shaft and adapted to optionally engage said last named gear portion and said main driven gear.

7. A selective speed transmission comprising a casing, a motor driven splined shaft rotatably mounted in said casing, a second shaft rotatably mounted in said casing parallel to said splined shaft, three different size driven pinions mounted on said second shaft, a main driven gear meshing with one of said driven pinions, and a pair of driving pinions slidably but non-rotatably mounted on said splined shaft and slidable into engagement with the other two driven pinions, respectively, for optionally driving said driven gear at either of two speeds, one of said driving pinions also being shiftable into engagement with said driven gear to drive the latter in the reverse direction.

8. A selective speed transmission comprising a casing, a motor driven splined shaft rotatably mounted in said casing, a second shaft rotatably mounted in said casing parallel to said splined shaft, three different size driven pinions mounted on said second shaft adjacent one end thereof, a main driven gear meshing with one of said driven pinions, a pair of driving pinions slidably but non-rotatably mounted on said splined shaft and slidable into engagement with the other two driven pinions, respectively, for optionally driving said driven gear at either of two speeds, one of said driving pinions also being shiftable into engagement with said driven gear to drive the latter in the reverse direction, and means for driving said motor driven splined shaft including a compound gear mounted for rotation on said second shaft adjacent the other end thereof.

9. A selective speed transmission comprising a casing, a motor driven gear in said casing, a splined shaft rotatably mounted in said casing, a second shaft in said casing and disposed parallel to said splined shaft, a double pinion on said second shaft having one of its pinion elements engaging with said motor driven gear, a driving pinion slidably but non-rotatably mounted on said splined shaft slidable into engagement with the other pinion element of said double pinion, or with said motor driven gear, a second double pinion on said second shaft comprising a smaller pinion element and a larger pinion element fixedly connected together, a second driven gear meshing with said smaller pinion element, and a second driving pinion slidably but non-rotatably mounted on said splined shaft and slidable into engagement with either said larger pinion element or said second driven gear.

10. A selective speed transmission comprising a casing, a motor driven gear in said casing, a splined shaft rotatably mounted in said casing in axial alignment with said motor driven gear, a second shaft in said casing and disposed parallel to said splined shaft, a double pinion on said second shaft having one of its pinion elements engaging with said motor driven gear, a driving pinion slidably but non-rotatably mounted on said splined shaft slidable into engagement with the other pinion element of said double pinion, means for connecting said driving pinion with said motor driven gear, a second double pinion on said second shaft comprising a smaller pinion element and a larger pinion element fixedly connected together, a second driven gear meshing with said smaller pinion element, and a second driving pinion slidably but non-rotatably mounted on said splined shaft and slidable into engagement with either said larger pinion element or said second driven gear.

11. A selective speed transmission comprising a casing, a motor driven gear in said casing, a splined shaft having one end journaled for rotation in said casing and the other end journaled for rotation with respect to and supported by said motor driven gear, a second shaft in said casing and disposed parallel to said splined shaft, a double pinion on said second shaft having one of its pinion elements engaging with said motor driven gear, a driving pinion slidably but non-rotatably mounted on said splined shaft slidable into engagement with the other pinion element of said double pinion, or with said motor driven gear, a second double pinion on said second shaft adjacent the end of said splined shaft which is journaled in said casing and comprising a smaller pinion element and a larger pinion element fixedly connected together, a second driven gear meshing with said smaller pinion element, and a second driving pinion slidably but non-rotatably mounted on said splined shaft and slidable into engagement with either said larger pinion element or said second driven gear.

12. A selective speed transmission comprising a casing, driving and driven members journaled for rotation therein, means for transmitting the drive to said driven member in both forward and reverse directions, means connecting said driving member with said last named means for transmitting the drive to said means at either of two speeds, and means associated with the last named means for preventing the transmission of the drive at the higher speed when said means is engaged to drive said driven member in reverse.

13. A selective speed transmission comprising a casing, a splined shaft rotatably mounted in said casing, means for driving said shaft at either of two speeds, two different size driven pinions fixedly connected and mounted in said casing for rotation about an axis parallel to said splined shaft, a main driven gear meshing with the smaller of said driven pinions, a driving pinion slidably but non-rotatably mounted on said splined shaft, a shifter for sliding said driving pinion into engagement with either the larger of said driven pinions or said driven gear, and means for preventing said driving gear from being slid into engagement with said driven gear whenever said shaft is being driven at the higher speed.

14. A selective speed transmission comprising a casing, a splined shaft rotatably mounted in said casing, means for driving said shaft at either of two speeds including a member slidable into either of two positions for determining the speed of said shaft, two different size driven pinions fixedly connected and mounted in said casing for rotation about an axis parallel to said splined shaft, a main driven gear meshing with the smaller of said driven pinions, a driving pinion slidably but non-rotatably mounted on said splined shaft, a shifter for sliding said driving pinion into engagement with either the larger of said driven pinions or said driven gear, and a rod carried on said member and positioned to engage said shifter when an attempt is made to move said shifter to shift said driving pinion into engagement with said driven gear whenever said member is in the position corresponding to the higher speed of said shaft.

15. In a selective speed transmission for a tractor having a transverse motor driven member including a gear, the combination of a transverse shaft carrying driving pinions through which the tractor is propelled, a double pinion element disposed below said shaft and having a pinion meshing with said motor driven gear to receive power therefrom and another pinion meshing with one of said driving pinions on said shaft for driving the latter, a longitudinally disposed power take-off shaft disposed below said double pinion element for driving mechanisms associated with the tractor, and means including a gear engaging one of the pinions of said double pinion element for driving said power take-off shaft from said motor driven member.

16. In a selective speed transmission for a tractor having a housing, a motor driven member journaled for rotation therein and including a gear, and a shaft carrying driving pinions through which the vehicle is propelled, the combination of a double pinion element having a pinion meshing with said gear and another pinion adapted to mesh with one of said driving pinions on said shaft whereby said shaft may be driven from said motor driven member through said double pinion element, means adapted to directly connect said shaft with said motor driven member, a power take-off shaft extending from the central portion of said housing for driving mechanisms associated with the vehicle, and means for driving said power take-off shaft from said double pinion element, whereby the speed of rotation of the power take-off shaft is the same, whether the tractor is propelled by power transmitted through said double pinion element or directly to said first mentioned shaft.

17. A tractor comprising a main housing divided into a front crank shaft compartment and a rear transmission compartment, a transversely disposed crank shaft in said front compartment, a splined shaft journaled for rotation in said rear transmission compartment and disposed in parallelism with respect to said crank shaft, a driven member through which the tractor is propelled, said driven member being mounted for rotation in said rear compartment, means for driving said driven member from said splined shaft at different speeds relative to said splined shaft, and means including a part coaxial with at least a portion of said last mentioned driving means and disposed below the splined shaft for driving said splined shaft from said crank shaft in the front crank shaft compartment at different speeds in the same direction relative to said crank shaft.

18. A tractor comprising a main housing divided into a front crank shaft compartment and a rear transmission compartment, a transversely disposed crank shaft in the front compartment, a transmission driving gear supported for rotation in said rear transmission compartment and driven from said crank shaft, a splined shaft journaled for rotation in said rear transmission compartment and having one end supported by said transmission driving gear, a driven member journaled in said transmission compartment and through which the tractor is propelled, means for driving said driven member from said splined shaft at different speeds relative to the splined shaft, and gear means associated with said transmission driving gear for driving said splined shaft therefrom at different speeds relative to the transmission driving gear.

19. A tractor comprising a main housing divided into a front crank shaft compartment and a rear transmission compartment, a transversely disposed crank shaft in the front compartment having one end extending through one side wall of the housing, a driving member on said extended end of the crank shaft outside of said housing and driven from said crank shaft, a cover attached to said one side wall of the housing over said driving member and with said one side wall of the housing forming a third compartment, a driving shaft having its ends journaled in bearings supported in said cover and in said one side wall of the housing and having a driven member fixed thereto so as to be operatively connected with said driving member to be driven thereby, one end of said second shaft extending into said rear compartment, a splined shaft and a driven member through which the tractor is propelled mounted in said rear compartment, said splined shaft having one end disposed adjacent and carried by said first driven member, means for driving said second driven member from said splined shaft at different speeds relative to said splined shaft, and means in said rear transmission compartment for driving said splined shaft from said second shaft at different speeds relative to said second shaft.

20. A tractor comprising a main housing divided into a front crank shaft compartment and a rear transmission compartment, a transversely disposed crank shaft in the front compartment having one end extending through one side wall of the housing, a driving member on said extended end of the crank shaft outside of said housing and driven from said crank shaft, a cover attached to said one side wall of the housing over said driving member and with said one side wall of the housing forming a third compartment, a driving shaft having its ends journaled in bearings supported in said cover and in said one side wall of the housing and having a driven member fixed thereto on the inside of said rear transmission compartment so as to be operatively connected with said driving member to be driven thereby, one end of said second shaft extending into said rear compartment and receiving said driven member, a third shaft mounted in the rear compartment in axial alignment with said second shaft, means for directly connecting said second and said third shafts whereby the latter is driven from the former at the same speed, speed change means through which said second and said third shafts may be coupled whereby the latter is driven from the former at a different speed, a driven member in the rear compartment through which the tractor is propelled, means for driving said driven member from said third shaft at different speeds relative to said third shaft.

21. In a selective speed transmission for a motor propelled vehicle having a housing, a motor driven member including a gear mounted therein, and a shaft disposed in axial alignment therewith and carrying driving pinions, the combination of a second shaft disposed below said first shaft and operatively connected to propel the vehicle, pinions on said second shaft adapted to mesh with said driving pinions, a double pinion element mounted for rotation on said second shaft and having a pinion meshing with said gear and another pinion meshing with one of said driving pinions on said first shaft, through which said shaft is driven from said motor driven member, means retaining said double pinion element against axial displacement on said second shaft, a power take-off shaft disposed below said double pinion element and extending from the lower portion of said housing at right angles to the axis of rotation of said double pinion element for driving mechanisms associated with the vehicle, and means for driving said power take-off shaft from said motor driven member comprising a shiftably mounted gear adapted to be moved into engagement with one of the pinions of said double pinion element.

22. A selective speed transmission comprising a casing, driving and driven members journaled for rotation therein, means for transmitting the drive to said driven member in both forward and reverse directions, means connecting said driving member with said last named means for transmitting the drive to said means at either of two speeds, separate control means for each of said two means, and means associated with said separate control means for preventing the transmission of the drive at the higher speed when said means is engaged to drive said driven member in reverse.

23. A selective speed transmission comprising a casing, driving and driven members journaled for rotation therein, means for transmitting the drive to said driven member in both forward and reverse directions, means connecting said driving member with said last named means for transmitting the drive to said means at either of two speeds, separate control means for each of said two means, and means positioned by one of said control means in one position thereof for preventing the movement of the other control means.

24. A selective speed transmission comprising a casing, driving and driven members journaled for rotation therein, means for transmitting the drive to said driven member in both forward and reverse directions, means connecting said driving member with said last named means for transmitting the drive to said means at either of two speeds, separate control means for each of said two means, and means carried by one of said control means and positioned by the movement thereof to one position so as to be engaged by the other control means for preventing the movement of the latter.

25. A selective speed transmission comprising a splined shaft rotatably mounted in said casing, means including a shiftable part for driving said shaft at either of two speeds, a main driven gear mounted for rotation in said casing, including a shiftable part for driving said main driven gear from said splined shaft at either of two speeds, separate means for shifting said parts, and a member carried by one of said separate means and engageable with the other to prevent the selection of one of the speeds for the main driven gear when said splined shaft is driven in a certain one of its optional speeds.

26. A tractor comprising a main housing divided into a front crank shaft compartment and a rear transmission compartment, a transversely disposed crank shaft in said front compartment, a splined shaft journaled for rotation in said rear transmission compartment and disposed in parallelism with respect to said crank shaft, a driven member through which the tractor is propelled, said driven member being mounted for rotation in said rear compartment, means for driving said driven member from said splined shaft, at different speeds relative to said splined shaft, means for driving said splined shaft from said crank shaft at different speeds relative to the crank shaft including a gear member rotatable about said driven member, a longitudinally disposed shaft journaled for rotation in said rear transmission compartment and extending alongside said driven member, and means for driving said shaft from said gear member.

27. A tractor comprising a main housing divided into a front crank shaft compartment and a rear transmission compartment, a transversely disposed crank shaft in said front compartment, a splined shaft journaled for rotation in said rear transmission compartment and disposed in parallelism with respect to said crank shaft, a driven member through which the tractor is propelled, said driven member being mounted for rotation in said rear compartment, means for driving said driven member from said splined shaft at different speeds relative to said splined shaft including a gear carrying shaft disposed below said splined shaft, means for driving said splined shaft from said crank shaft at different speeds including a double pinion member mounted for rotation on the shaft that is disposed below said splined shaft, a longitudinally extending fourth shaft journaled for rotation in said housing and extending alongside said driven gear, and means for driving said power take-off shaft from said double pinion element including a pair of bevel gears and shiftable means establishing an optional connection between the latter and one of the pinions of said double pinion element.

28. A tractor comprising a main housing divided into a front crank shaft compartment and a rear transmission compartment, a transversely disposed crank shaft in said front compartment, a splined shaft journaled for rotation in said rear transmission compartment and disposed in parallelism with respect to said crank shaft, a driven member through which the tractor is propelled, said driven member being mounted for rotation in said rear compartment, a transversely disposed shaft journaled for rotation in said rear transmission compartment below said splined shaft and operatively connected with said driven member, means for driving said third shaft from said splined shaft at different speeds relative to the latter including gear means mounted on both shafts, and means for driving said splined shaft from the crank shaft in the front crank shaft compartment including a compound gear member mounted for rotation relative to and supported upon said third shaft.

29. A tractor comprising a main housing divided into a front crank shaft compartment and a rear transmission compartment, a transversely disposed crank shaft in the front compartment having one end extending through one side wall of the housing, a driving member on said extended end of the crank shaft outside of said housing and driven from said crank shaft, a cover attached to said one side wall of the housing over said gear and with said one side wall of the housing forming a third compartment, a driving shaft having its ends journaled in bearings supported in said cover and in said one side wall of the housing and having a driven member fixed thereto so as to be operatively connected with said driving member to be driven thereby, one end of said second shaft supporting said driven member and extending into said rear compartment, a third shaft mounted in the rear compartment in axial alignment with said second shaft, a fourth shaft mounted in said rear compartment in parallel relation with respect to said third shaft, means for directly connecting said second and said third shafts whereby the latter is driven from the former at the same speed, and speed change means through which said second and said third shafts may be coupled whereby the latter is driven from the former at a different speed including a member mounted for rotation on said fourth shaft.

30. In a selective speed transmission for a motor propelled vehicle, the combination of a motor driven member including a gear, a shaft carrying driving pinions through which the vehicle is propelled, a driven shaft mounted below said first mentioned shaft, and a double pinion element disposed in a position between said shafts and having a pinion meshing with said motor driven member and another pinion adapted to be operatively connected with said second mentioned shaft for driving the same and with the shaft carrying said driving pinions.

31. In a selective speed transmission for a motor propelled vehicle, the combination of a motor driven member including a gear, a shaft carrying driving pinions through which the vehicle is propelled, means including a power take-off shaft and a pinion shiftably associated therewith for driving mechanisms associated with the vehicle, and a double pinion element disposed between said first shaft and said shiftable pinion, said double pinion element having a pinion meshing with said motor driven gear and another pinion adapted to be engaged with said shiftable pinion for driving said power take-off shaft and with the shaft carrying said driving pinions.

32. In a selective speed transmission for a tractor having a transverse motor driven member including a gear, the combination of a pair of transverse splined shafts, one being adapted to be directly connected to said motor driven member, a double pinion element arranged coaxially of the other splined shaft and having one pinion meshing with said motor driven gear, a shiftable pinion on said first mentioned splined shaft and engageable with the other pinion of said double pinion element, whereby said first mentioned splined shaft may be driven from said motor driven member through said double pinion element, means for driving the tractor from the other splined shaft, and engageable gear means connecting said splined shafts.

ELMER McCORMICK.
WAYNE H. WORTHINGTON.

CERTIFICATE OF CORRECTION.

Patent No. 2,103,543.            December 28, 1937.

ELMER McCORMICK, ET AL.

It is hereby certified that error appears in the printed specification of the above numbered patent requiring correction as follows: Page 8, first column, line 1, claim 27, strike out the word "fourth"; line 3-4 same claim, strike out the words "power take-off" and insert instead the word fourth; and that the said Letters Patent should be read with these corrections therein that the same may conform to the record of the case in the Patent Office.

Signed and sealed this 1st day of March, A. D. 1938.

(Seal)                         Henry Van Arsdale,
                                     Acting Commissioner of Patents.

tudinally extending fourth shaft journaled for rotation in said housing and extending alongside said driven gear, and means for driving said power take-off shaft from said double pinion element including a pair of bevel gears and shiftable means establishing an optional connection between the latter and one of the pinions of said double pinion element.

28. A tractor comprising a main housing divided into a front crank shaft compartment and a rear transmission compartment, a transversely disposed crank shaft in said front compartment, a splined shaft journaled for rotation in said rear transmission compartment and disposed in parallelism with respect to said crank shaft, a driven member through which the tractor is propelled, said driven member being mounted for rotation in said rear compartment, a transversely disposed shaft journaled for rotation in said rear transmission compartment below said splined shaft and operatively connected with said driven member, means for driving said third shaft from said splined shaft at different speeds relative to the latter including gear means mounted on both shafts, and means for driving said splined shaft from the crank shaft in the front crank shaft compartment including a compound gear member mounted for rotation relative to and supported upon said third shaft.

29. A tractor comprising a main housing divided into a front crank shaft compartment and a rear transmission compartment, a transversely disposed crank shaft in the front compartment having one end extending through one side wall of the housing, a driving member on said extended end of the crank shaft outside of said housing and driven from said crank shaft, a cover attached to said one side wall of the housing over said gear and with said one side wall of the housing forming a third compartment, a driving shaft having its ends journaled in bearings supported in said cover and in said one side wall of the housing and having a driven member fixed thereto so as to be operatively connected with said driving member to be driven thereby, one end of said second shaft supporting said driven member and extending into said rear compartment, a third shaft mounted in the rear compartment in axial alignment with said second shaft, a fourth shaft mounted in said rear compartment in parallel relation with respect to said third shaft, means for directly connecting said second and said third shafts whereby the latter is driven from the former at the same speed, and speed change means through which said second and said third shafts may be coupled whereby the latter is driven from the former at a different speed including a member mounted for rotation on said fourth shaft.

30. In a selective speed transmission for a motor propelled vehicle, the combination of a motor driven member including a gear, a shaft carrying driving pinions through which the vehicle is propelled, a driven shaft mounted below said first mentioned shaft, and a double pinion element disposed in a position between said shafts and having a pinion meshing with said motor driven member and another pinion adapted to be operatively connected with said second mentioned shaft for driving the same and with the shaft carrying said driving pinions.

31. In a selective speed transmission for a motor propelled vehicle, the combination of a motor driven member including a gear, a shaft carrying driving pinions through which the vehicle is propelled, means including a power take-off shaft and a pinion shiftably associated therewith for driving mechanisms associated with the vehicle, and a double pinion element disposed between said first shaft and said shiftable pinion, said double pinion element having a pinion meshing with said motor driven gear and another pinion adapted to be engaged with said shiftable pinion for driving said power take-off shaft and with the shaft carrying said driving pinions.

32. In a selective speed transmission for a tractor having a transverse motor driven member including a gear, the combination of a pair of transverse splined shafts, one being adapted to be directly connected to said motor driven member, a double pinion element arranged coaxially of the other splined shaft and having one pinion meshing with said motor driven gear, a shiftable pinion on said first mentioned splined shaft and engageable with the other pinion of said double pinion element, whereby said first mentioned splined shaft may be driven from said motor driven member through said double pinion element, means for driving the tractor from the other splined shaft, and engageable gear means connecting said splined shafts.

ELMER McCORMICK.
WAYNE H. WORTHINGTON.

CERTIFICATE OF CORRECTION.

Patent No. 2,103,543.     December 28, 1937.

ELMER McCORMICK, ET AL.

It is hereby certified that error appears in the printed specification of the above numbered patent requiring correction as follows: Page 8, first column, line 1, claim 27, strike out the word "fourth"; line 3-4 same claim, strike out the words "power take-off" and insert instead the word fourth; and that the said Letters Patent should be read with these corrections therein that the same may conform to the record of the case in the Patent Office.

Signed and sealed this 1st day of March, A. D. 1938.

(Seal)

Henry Van Arsdale,
Acting Commissioner of Patents.

CERTIFICATE OF CORRECTION.

Patent No. 2,103,543.                                      December 28, 1937.

ELMER McCORMICK, ET AL.

It is hereby certified that error appears in the printed specification of the above numbered patent requiring correction as follows: Page 8, first column, line 1, claim 27, strike out the word "fourth"; line 3-4 same claim, strike out the words "power take-off" and insert instead the word fourth; and that the said Letters Patent should be read with these corrections therein that the same may conform to the record of the case in the Patent Office.

Signed and sealed this 1st day of March, A. D. 1938.

Henry Van Arsdale,
(Seal)                                   Acting Commissioner of Patents.